Oct. 18, 1932.  G. R. RODDY  1,882,930
SEWAGE DISPOSAL SYSTEM
Filed Aug. 16, 1929   3 Sheets-Sheet 1

INVENTOR.
G. R. Roddy
BY Barker & Collings
ATTORNEYS

Oct. 18, 1932.  G. R. RODDY  1,882,930
SEWAGE DISPOSAL SYSTEM
Filed Aug. 16, 1929  3 Sheets-Sheet 2
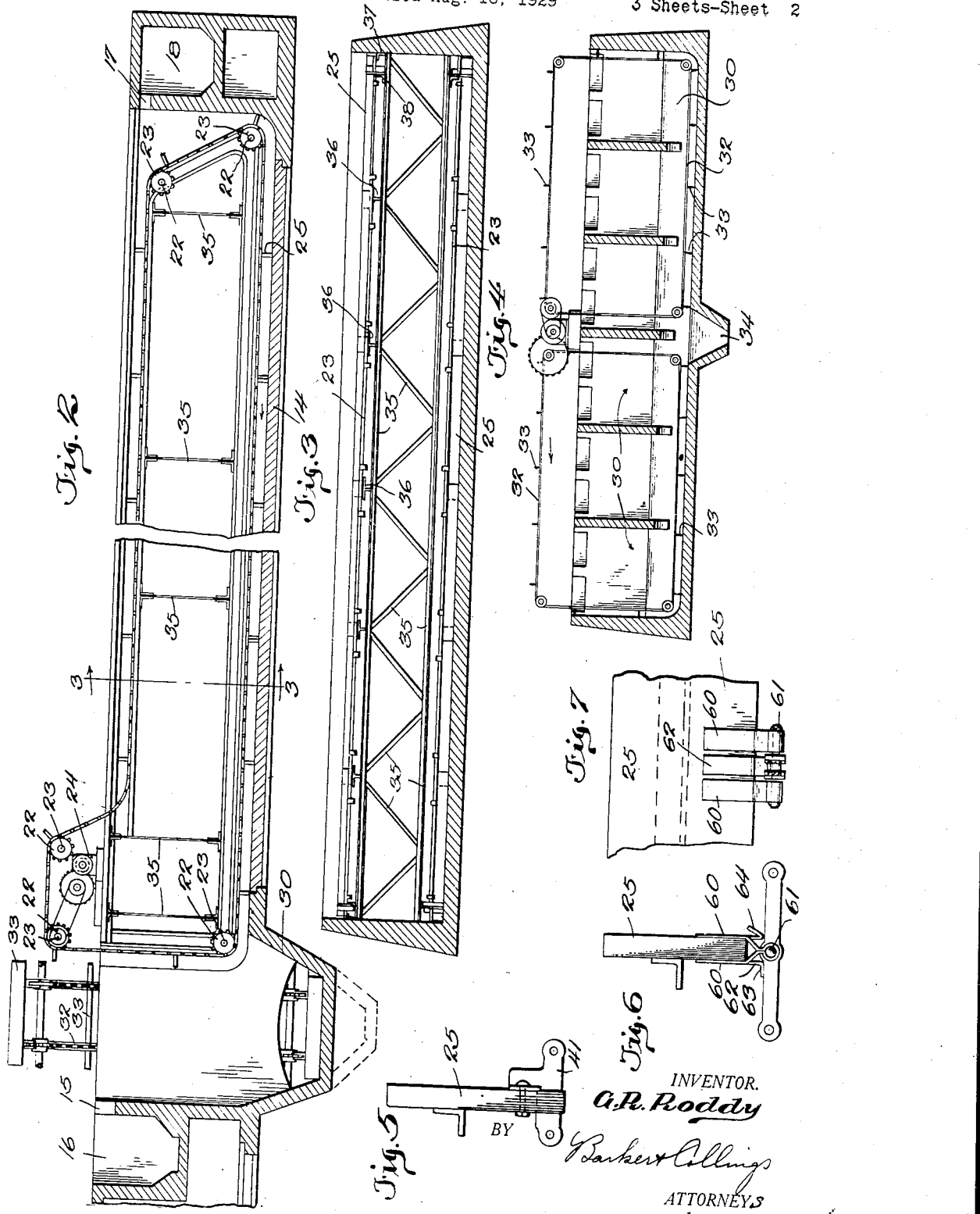
INVENTOR.
G. R. Roddy
BY Barker + Collings
ATTORNEYS Oct. 18, 1932.　　　　G. R. RODDY　　　　1,882,930
SEWAGE DISPOSAL SYSTEM
Filed Aug. 16, 1929　　　3 Sheets-Sheet 3
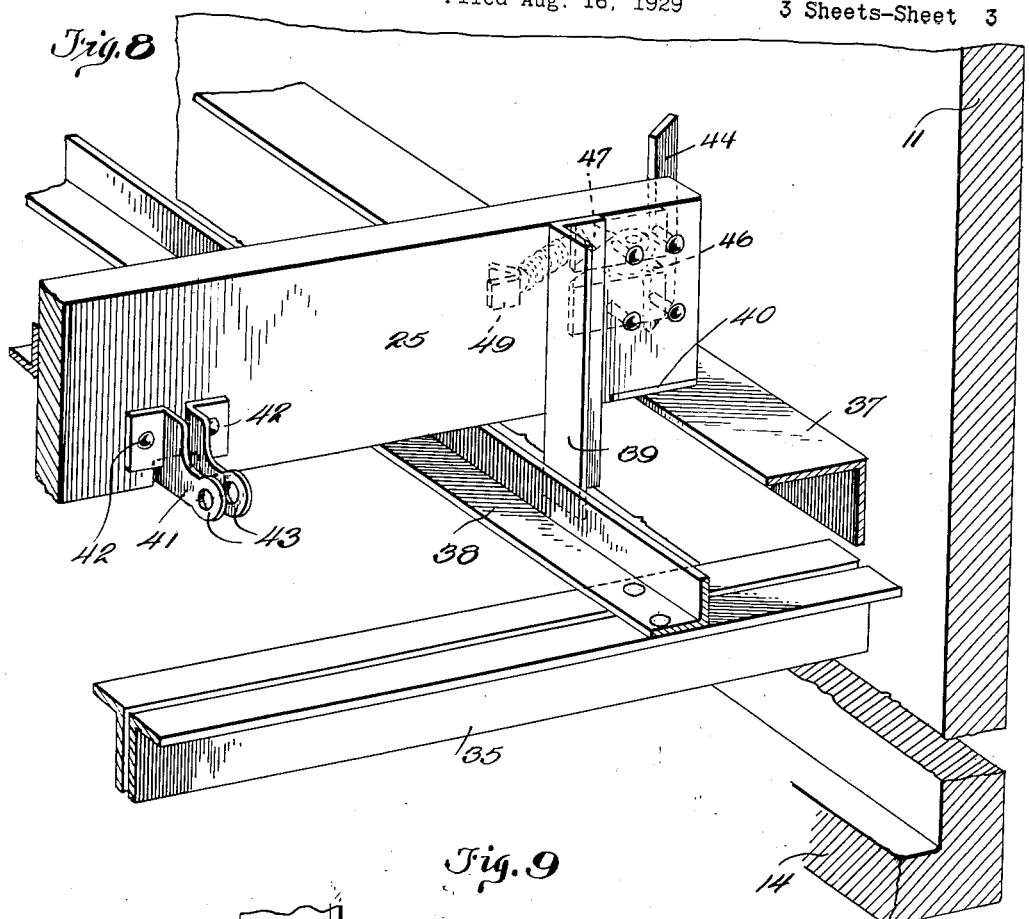
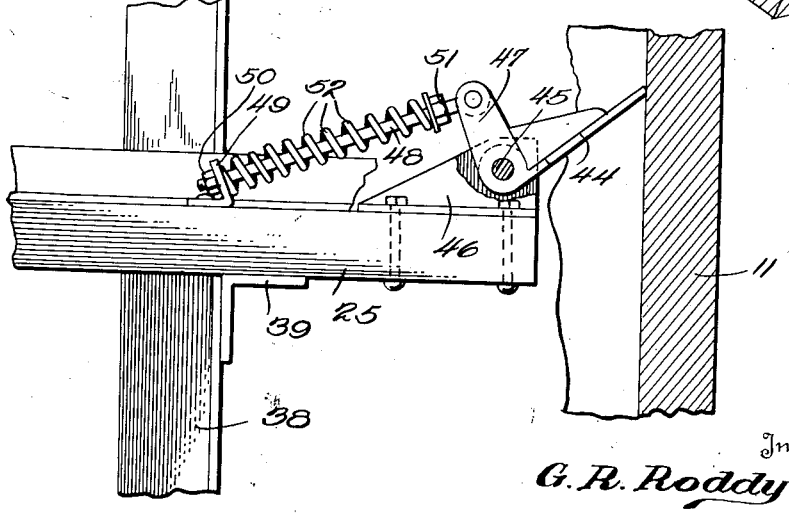
Inventor
G. R. Roddy
By Barker & Collings
Attorneys Patented Oct. 18, 1932

1,882,930

UNITED STATES PATENT OFFICE

GUSTAV R. RODDY, OF MILWAUKEE, WISCONSIN, ASSIGNOR TO CHAIN BELT COMPANY, OF MILWAUKEE, WISCONSIN, A CORPORATION OF WISCONSIN

SEWAGE DISPOSAL SYSTEM

Application filed August 16, 1929. Serial No. 386,359.

This invention relates to sewage disposal systems and has for one of its objects to improve the constructions of such systems which have been heretofore proposed.

While sewage disposal plants have been in use for a number of years in various cities, the constructions heretofore have been on a relatively small scale, while today the tendency is toward the building of large sewage disposal plants which will take care of practically an unlimited quantity of sewage. In the most common forms of plants concrete setting tanks are provided into which the sewage is introduced and in which the solid matters are permitted to settle to the bottom, from which they are removed by means of scrapers carried by endless chains which pass slowly through the tanks. Ordinarily these scrapers take the form of wooden flights or bars carried by two or more endless chains which pass around suitable sprockets and are driven by an electric motor or other source of power. Heretofore the settling tanks have been made relatively narrow, usually about 16 feet in width, this being the standard length of the lumber from which the flights or scrapers are made. However, since the requirements of a city or town of even moderate size necessitate the use of several tanks and conveyors of such width, such construction involves the provision of a large number of concrete division walls between the separate conveyors where two or more are employed. Where relatively large plants are desired in accordance with present day practice, involving the use of 4, 6, 8 or more conveyors, the cost of setting the forms and of the material entering into these division walls constitutes quite an item of expense in the construction of the plant which it is desirable to avoid.

It is one of the principal objects of the present invention to provide a construction whereby relatively large settling tanks may be employed accommodating two or more conveyor lines, each having flights of the standard 16 ft. length in which there are no division walls, thereby materially reducing the cost of construction and installation. The settling tanks constructed in accordance with the present invention have a flat, unobstructed bottom over the entire surface area, across which bottom two or more lines of conveyors continuously travel, the flights of the said conveyors being so arranged as to overlap at their ends whereby the entire surface area of the bottom of the tanks is continuously scraped free of the sludge which accumulates thereon.

Due to the overlapping of the ends of the conveyor flights, it is necessary to span the tanks above the floor with suitable beams or girders to constitute supports for the upper or return run of the conveyors, and the present invention contemplates the provision of such supporting members.

With the above and other objects in view which will appear as the description proceeds, the invention consists in the novel details of construction and combinations and arrangements of parts more fully hereinafter disclosed and particularly pointed out in the appended claims.

Referring to the accompanying drawings forming part of this specification in which like reference characters designate like parts in all the views:

Figure 2 is a vertical longitudinal sectional view taken approximately on the plane indicated by the line 2—2 of Fig. 1 looking in the direction of the arrows;

Figure 3 is a transverse vertical sectional view taken approximately on the plane indicated by the line 3—3 of Fig. 2 looking in the direction of the arrows;

Figure 4 is a transverse vertical sectional view taken at the discharge end of the tank approximately on the plane indicated by the line 4—4 of Fig. 1;

Figure 5 is a detail end elevational view of one of the flights showing the method of rigidly securing the same to the conveyor chains;

Figure 6 is a similar view illustrating one means of pivotally connecting certain of the flights to the conveyor chains;

Figure 7 is a face view of the parts shown in Fig. 6;

Figure 8 is a detail prospective view of a portion of the side walls of the tank and the end of one of the flights showing the yielding shoes or scrapers employed thereon to scrape the said walls; and Figure 9 is a top plan view partly in section of the parts illustrated in Fig. 8.

Figure 1:
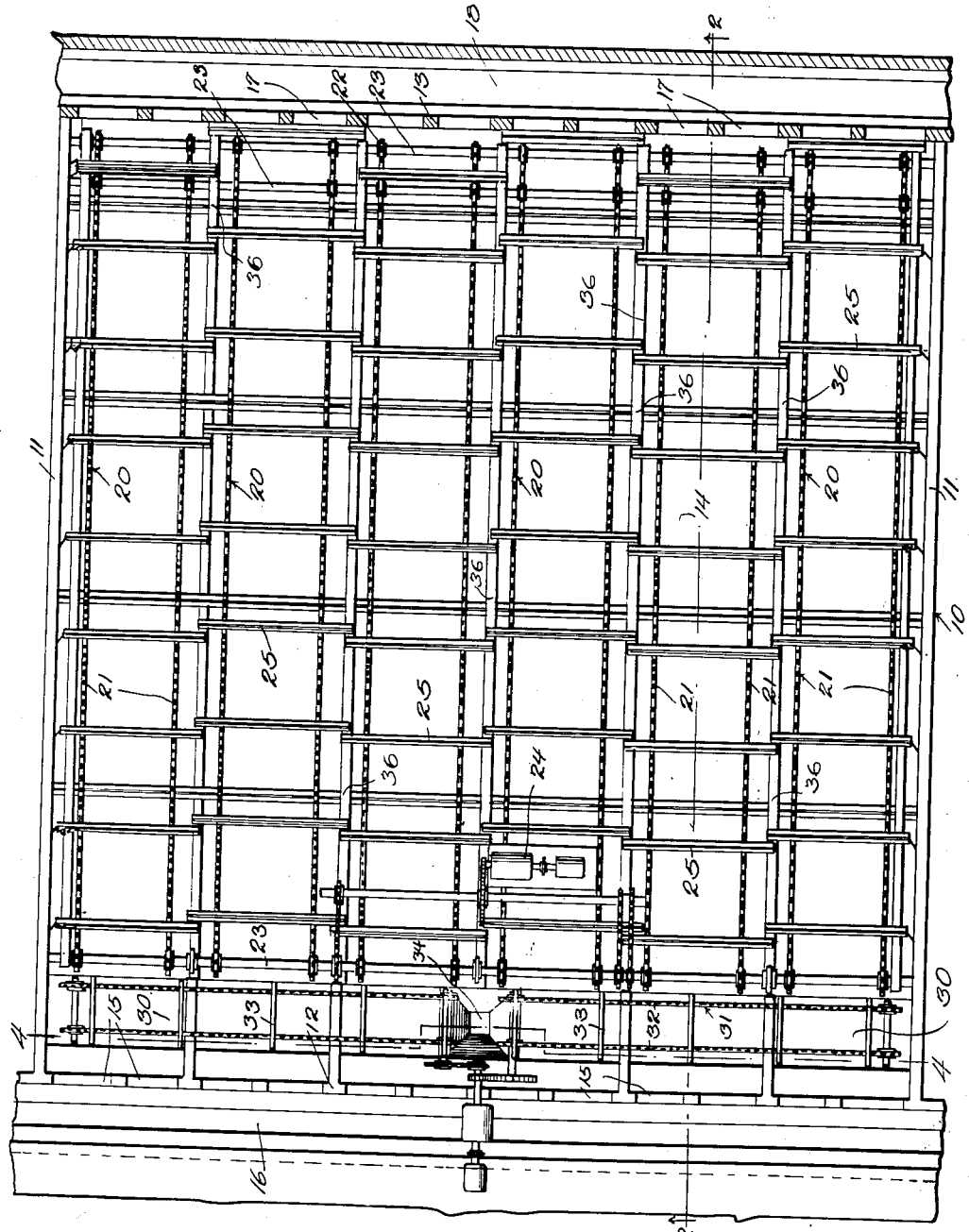
Figure 1 is a top plan view of a settling tank for a sewage disposal system adapted to accommodate six lines of conveyors for the removal of sludge.

Referring more particularly to Figs. 1, 2, 3 and 4, 10 indicates generally a concrete settling tank for a sewage disposal system having the side walls 11, end walls 12 and 13, and the bottom 14. The end wall 12 is provided with a plurality of inlet ports 15 which may be controlled by suitable valves, not shown, through which the sewage is admitted to the tank from the conduit 16. In like manner the end wall 13 is provided with a plurality of outlet ports 17 which may be valve controlled, through which the liquid matter may be discharged into the conduit 18, all as is well known in this art.

As above stated, the bottom 14 of the tank is entirely free from projections or obstructions, either in the form of division walls or supporting pillars. A plurality of conveyors 20, here shown as six in number, are positioned within the tank, each conveyor comprising a pair of spaced sprocket chains 21 which pass around suitable sprockets 22 as will be clear from Figs. 1 and 2. These sprockets are mounted upon shafts 23 suitably journalled in the frame work, and the conveyors are slowly moved through the tank by means of an electric motor or other source of power 24.

Each pair of sprocket chains has connected to it suitably spaced transverse flights or scrapers 25, which may be rigidly connected to the chains in the manner indicated in Fig. 5, or they may be pivotally connected to the chains as indicated in Figs. 6 and 7. These said flights are preferably constructed of wood in the usual manner but as is clearly shown in Fig. 1, the flights of the adjacent conveyors are staggered longitudinally of their line of travel and the ends of the flights of one conveyor project beyond or overlap the ends of the flights of the adjacent conveyor, thereby assuring that the entire surface area of the bottom of the tank will be subjected to the scraping and cleaning action of the flights.

It will be understood that the lower sprockets 22 are so positioned within the tank that the flights of the lower run of the conveyors, which move from right to left as seen in Fig. 2, rest upon and scrape the bottom 14 of the tank as they are moved thereover. The accumulated sludge is moved toward the left as is viewed in Figs. 1 and 2, and is deposited in the depressions or wells 30 formed at the inlet end of the tanks, from whence it may be removed by a suitable pump or by means of transverse conveyors 31 comprising spaced chains 32 and transverse flights 33 as shown in the drawings. As here shown there are two of these transverse conveyors, the lower runs of which move from the outer side walls 11 to the center whereby the sludge in the wells 30 is moved to the central hopper 34 from whence it may pass into suitable vehicles or conveyors to be conveyed away and disposed of.

In order to keep the floor surface free from obstructions and at the same time support the upper or return runs of the conveyors 20, suitable transverse beams or girder constructions 35 are provided extending across the tank from side wall to side wall. These transverse beams carry suitable longitudinal supporting tracks 36 on which the overlapping ends of the conveyor flights may rest during their travel. Similar members 37 are carried by the side walls 11, see Fig. 8, for supporting the ends of the outermost conveyor flights. In order to guide the said flights and to prevent movement of them transversely of the tank, a guide rail or member 38 extends longitudinally of the tank which is adapted to be engaged by a vertical guide member 39, carried by the flight. The lower surface of the flights may be provided with suitable steel wear plates 40 for resting upon the longitudinal guides 36 and 37 to take the wear.

As above stated the flights may be rigidly connected to the chains 21, as by the brackets 41 shown in Figs. 5 and 8. These brackets, as will be seen from the drawings, are rigidly secured to the flights by bolts or rivets 42 and to the chains by the usual chain pins which pass through the openings 43. The flights of the two outside conveyors, i. e. those adjacent the side walls 11, preferably carry at their ends suitable yielding scrapers or shoes for scraping the said side walls. This construction is best shown in Figs. 8 and 9, from which it will be noted that the shoes 44 are pivoted upon pins 45 carrying in brackets 46 rigidly mounted at the ends of the flights 25. The said shoes have angularly projecting arms 47 to which are pivotally secured rods or pins 48, the free ends of which pass through angle members 49 and carry nuts 50 in back thereof. The said rods 48 also carry threaded nuts 51, and coil springs 52 are interposed between the said nuts 51 and the bracket members 49, which springs normally tend to urge the shoes or scrapers 44 into engagement with the side wall 11 as will be readily understood. Such engagement, however, will be a yielding one whereby the apparatus will accommodate itself to any inequalities in the surface of the wall.

In some instances, it may be desirable to have some or all of the flights 25 pivotally connected to the chains, and one form of such connection is shown in Figs. 6 and 7. That is to say, the flights 25 carry a pair of spaced strap members 60 which are looped around the chain pins, as at 61 and between the said strap members 60 upon each side of the flight, there is located a strap member 62, the lower end of which is bent as indicated at 63 and 64. The member 62 which is shown at the left of Fig. 6 has its lower end bent at substantially right angles, while the member 63 upon the opposite side has its end to an acute angle. These bent ends are adapted to engage the chain links and act as stops for limiting the pivoted movement of the flight, the stop 63 serving to hold the flight in a position at substantially right angles to the chain, while the stop 64 permits the flight being inclined in a clockwise direction as viewed in Fig. 6 until the end 64 engages the chain, as will be readily understood.

While one form of the invention has been illustrated and described it is obvious that those skilled in the art may vary the details of construction, as well as the precise arrangement of parts without departing from the spirit of the invention, and therefore it is not wished to be limited to the above disclosure, except as may be required by the claims.

What I claim is:

1. In a sewage disposal plant, a settling tank of relatively great width, devoid of intermediate walls or supports and having an unobstructed floor surface; and a plurality of sludge removing conveyers in said tank, the ends of the flights of adjacent conveyors overlapping whereby they may remove sludge from the entire area of said floor surface.

2. In a sewage disposal plant, a settling tank of relatively great width, devoid of intermediate walls or supports and having an unobstructed floor surface; and a plurality of sludge removing conveyers in said tank, the flights of adjacent conveyers being staggered and having their ends overlapping, whereby they may remove sludge from the entire area of said floor surface.

3. In a sewage disposal plant, a settling tank of relatively great width, devoid of intermediate walls or supports and having an unobstructed floor surface; a plurality of sludge removing conveyors in said tank, the flights of adjacent conveyors being staggered and having their ends overlapping, whereby they may remove sludge from the entire area of said floor surface; and means above said floor surface for supporting said conveyors during a portion of their travel.

4. In a sewage disposal plant, a settling tank; conveyors in said tank having flights adapted to remove sludge from the floor thereof; and yielding scrapers carried by the ends of the flights of the conveyors adjacent the side walls of said tanks, for removing sludge from said side walls.

5. In a sewage disposal plant, a settling tank; and conveyers in said tank comprising spaced endless belts and scraper flights secured thereto, for removing sludge from the bottom of said tank, certain of said flights being rigidly connected to said belts and others being pivotally connected thereto.

6. In a sewage disposal plant, a settling tank; conveyors in said tank, comprising spaced endless belts and scraper flights secured thereto, for removing sludge from the bottom of said tank certain of said flights being rigidly connected to said belts and others being pivotally connected thereto; and means associated with said pivotal connections for limiting the pivotal movements of the flights relative to the belts.

In testimony whereof I affix my signature.

GUSTAV R. RODDY.